(12) United States Patent
Nayak et al.

(10) Patent No.: US 8,059,355 B2
(45) Date of Patent: Nov. 15, 2011

(54) DUAL STAGE HEAD ACTUATOR ASSEMBLY FOR TAPE DRIVE

(75) Inventors: Ashok B. Nayak, Glendora, CA (US); Ming-Chih Weng, Los Angeles, CA (US); Turguy Goker, Solana Beach, CA (US)

(73) Assignee: Quantum Corporation, San Jose, CA (US)

( * ) Notice: Subject to any disclaimer, the term of this patent is extended or adjusted under 35 U.S.C. 154(b) by 53 days.

(21) Appl. No.: 12/480,475

(22) Filed: Jun. 8, 2009

(65) Prior Publication Data

US 2010/0309579 A1  Dec. 9, 2010

(51) Int. Cl.
*G11B 21/02* (2006.01)
(52) U.S. Cl. .......................................... 360/75
(58) Field of Classification Search .................. None
See application file for complete search history.

(56) References Cited

U.S. PATENT DOCUMENTS

| | | | |
|---|---|---|---|
| 3,526,726 A | 9/1970 | Corbett | |
| 4,099,211 A | 7/1978 | Hathaway | |
| 4,295,172 A | 10/1981 | Fukada | |
| 4,438,469 A | 3/1984 | Ohba | |
| 5,191,492 A | 3/1993 | Nayak | |
| 5,438,469 A | 8/1995 | Rudl | |
| 5,729,077 A | 3/1998 | Newnham | |
| 5,901,008 A * | 5/1999 | Nayak et al. | 360/78.02 |
| 6,075,678 A | 6/2000 | Saliba | |
| 6,157,522 A | 12/2000 | Murphy | |
| 6,222,698 B1 | 4/2001 | Barndt | |
| 6,233,124 B1 | 5/2001 | Budde | |
| 6,327,120 B1 | 12/2001 | Koganezawa | |
| 6,404,598 B1 | 6/2002 | Nayak | |
| 6,411,474 B1 | 6/2002 | Anderson | |
| 6,839,197 B2 * | 1/2005 | Chliwnyj et al. | 360/77.12 |
| 7,054,093 B1 | 5/2006 | Anderson | |
| 7,054,101 B1 * | 5/2006 | Marion et al. | 360/90 |
| 7,061,712 B2 | 6/2006 | Harper et al. | |
| 7,133,261 B2 | 11/2006 | Biskeborn | |
| 7,203,027 B2 * | 4/2007 | McCormack et al. | 360/75 |
| 7,221,534 B2 | 5/2007 | Anderson et al. | |
| 7,227,724 B2 * | 6/2007 | Nayak et al. | 360/261.1 |
| 7,230,788 B2 * | 6/2007 | Goker et al. | 360/75 |
| 7,359,160 B2 | 4/2008 | Koga | |
| 7,379,259 B2 * | 5/2008 | Nayak et al. | 360/75 |

(Continued)

*Primary Examiner* — K. Wong
(74) *Attorney, Agent, or Firm* — Roeder & Broder LLP; James P. Broder

(57) ABSTRACT

An actuator assembly (22) for positioning a head (16) of a tape drive (10) relative to a storage tape that moves along a tape path (24) includes a first actuator (228), a second actuator (230) and a controller (26). The actuators (228, 230) move the head (16) in a direction that is substantially perpendicular to the tape path. The first actuator (228) is mounted to the second actuator (230) at a location that is based on a position of a resonance node (680) of the second actuator (230). The controller (26) controls linear positioning of the first actuator (228) and the second actuator (230) relative to the storage tape on a closed-loop basis. The actuators (228, 230) can each include voice coils (246, 260). The second actuator (230) can include two positioner guides (253A, 253B) that are configured in a substantially collinear configuration or in a triangular configuration with the head (16). The first actuator (228) can include an isolation boot (232) that decreases vibration of the first actuator (228) caused by vibration of the second actuator (230). The actuators (228, 230) can have resonance frequencies that are different from one another. The first fundamental resonance frequency can be tuned based on the second resonance frequency to decrease a correlation between the resonances of the actuators (228, 230).

25 Claims, 8 Drawing Sheets

U.S. PATENT DOCUMENTS 7,474,495 B2 1/2009 Weng et al.
7,679,864 B2 * 3/2010 Nayak et al. ............... 360/261.1
7,684,144 B1 * 3/2010 Goker et al. ............... 360/77.12
2007/0285845 A1 12/2007 Nayak

* cited by examiner

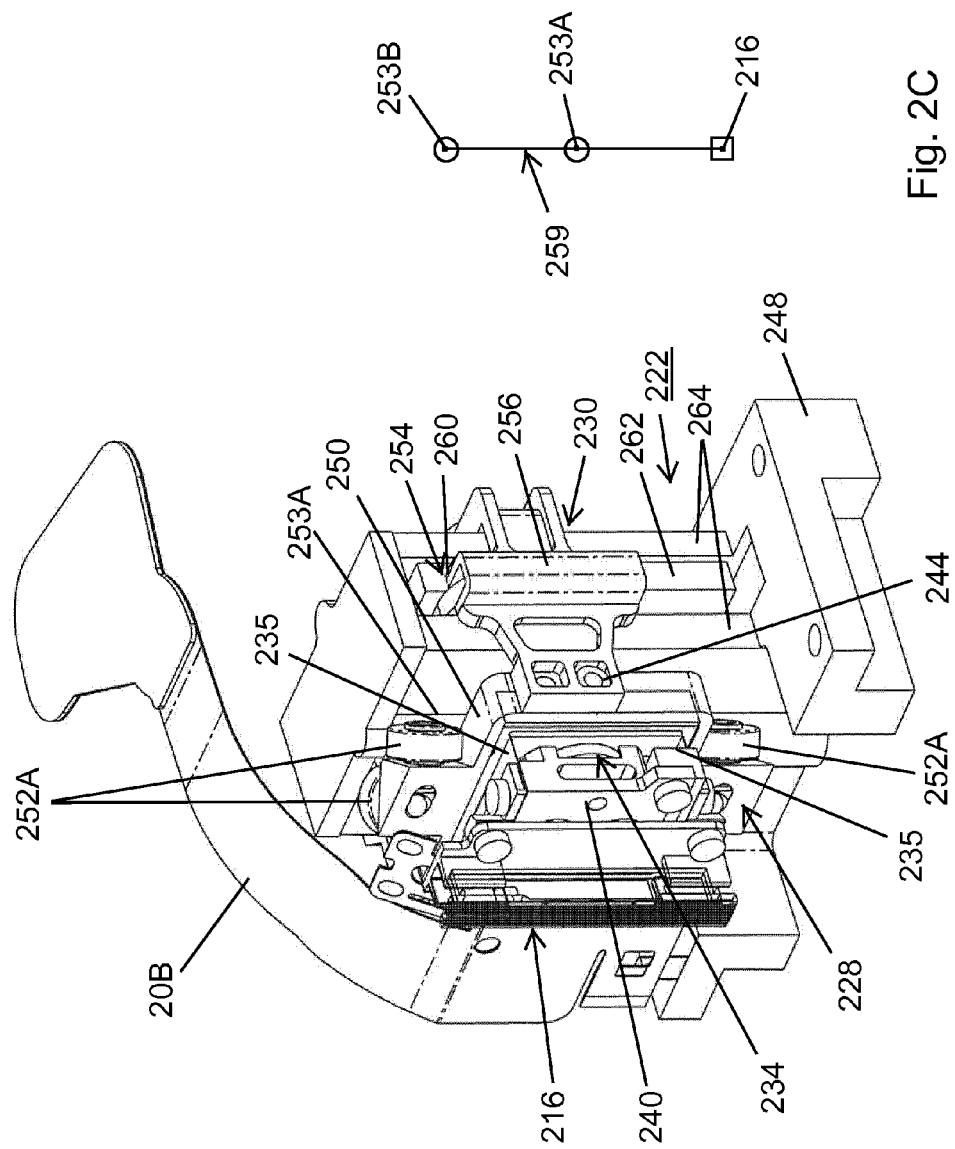

DUAL STAGE HEAD ACTUATOR ASSEMBLY FOR TAPE DRIVE

BACKGROUND

Linear tape drive systems provide for high-density recording on multiple tracks of a magnetic tape. In certain arrangements, parallel tracks extend along a longitudinal direction of the magnetic tape. During recording or playback, the read/write elements of the head should be aligned with the desired track as the tape moves in a longitudinal direction across the read/write bump. Closed loop positioners are often used in tape systems having higher track densities. In high-density tape systems, the tape may wander in the lateral direction as it moves in the longitudinal direction across a read/write head, which results in an offset between the read/write head and the track center line.

To avoid these types of problems, tape cartridges for high-density tape drives are preformatted with information often called servo information, which is used to maintain the correct lateral position of the tape with respect to the read/write head. Servo information provides the system with feedback to determine the continuous position of the tape relative to the head. Analysis of the servo signals allows for a determination of an offset and the distance of the offset between the track and the head. Based on the information, the head is moved by a positioner to the center line of the track so that write/read operations can occur properly. Closed loop positioners generally use fine positioners to move the head during a write/read operation. These fine positioners are used to maintain the position of the head at the center line of the track under a closed loop servo control using the preformatted servo information on the tape.

Linear Tape Open ("LTO") is a computer storage magnetic tape format that employs a servo-based, closed loop control mechanism. The LTO roadmap calls for successive increases in capacity and speed. As track densities increase with each new generation of LTO tape cartridges, the ability to precisely control the read/write head relative to the magnetic tape becomes increasingly important.

SUMMARY

The present invention is directed toward an actuator assembly for positioning a head of a tape drive relative to a storage tape that moves along a tape path. In one embodiment, the actuator assembly includes a first actuator, a second actuator and a controller. The first actuator moves the head in a direction that is substantially perpendicular to the tape path. The second actuator moves the first actuator and the head in a direction that is substantially perpendicular to the tape path. In one embodiment, the first actuator is mounted to the second actuator at a location that is based at least partially on a position of a resonance node of the second actuator. The controller receives a positioning signal from the head. The controller controls positioning of the first actuator and the second actuator relative to the storage tape based at least partially on the positioning signal to move the head in a substantially linear manner relative to the storage tape.

In another embodiment, the first actuator includes a first voice coil and the second actuator includes a second voice coil. In one embodiment, the first actuator includes a first carriage that retains the head and the first voice coil. In another embodiment, the first voice coil includes a substantially flat coil. In one embodiment, the second voice coil includes a substantially circular coil. In another embodiment, the second voice coil includes a substantially flat coil. The second actuator can include two positioner guides that guide movement of the first actuator in a direction that is substantially perpendicular to the tape path. In one embodiment, the positioner guides and the head can be positioned in a substantially collinear configuration. In another embodiment, the positioner guides and the head are positioned in a triangular configuration.

The first actuator can include an isolation boot positioned adjacent to the second actuator. In one embodiment, the isolation boot decreases vibration of the first actuator that is caused by vibration of the second actuator. In certain embodiments, the first actuator can have a first fundamental resonance frequency and the second actuator can have a second resonance frequency that is different than the first fundamental resonance frequency. In one such embodiment, the first fundamental resonance frequency is designed based on the second resonance frequency to decrease a correlation between the resonances of the actuators. In one embodiment, the second resonance frequency is at least 2 times higher than the first fundamental resonance frequency.

In another embodiment, the tape drive can include a housing, and the second actuator can include a second voice coil and an actuator base plate. The actuator base plate is secured to the housing. In one embodiment, the actuator base plate includes a magnetic core that electromagnetically interacts with the second voice coil.

In addition to the aspects and embodiments described above, further aspects and embodiments will become apparent by reference to the drawings and by study of the following description.

BRIEF DESCRIPTION OF THE DRAWINGS

The invention, together with further advantages thereof, may best be understood by reference to the following description taken in conjunction with the accompanying drawings, taken in conjunction with the accompanying description, in which similar reference characters refer to similar parts, and in which:

FIG. 2A is a perspective view of a portion of the tape drive including one embodiment of the actuator assembly;

FIG. 2C is a simplified schematic top view of a portion of the actuator assembly illustrated in FIGS. 2A and 2B;

DESCRIPTION

Embodiments of the present invention are described herein in the context of a system and method for tape drive control. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
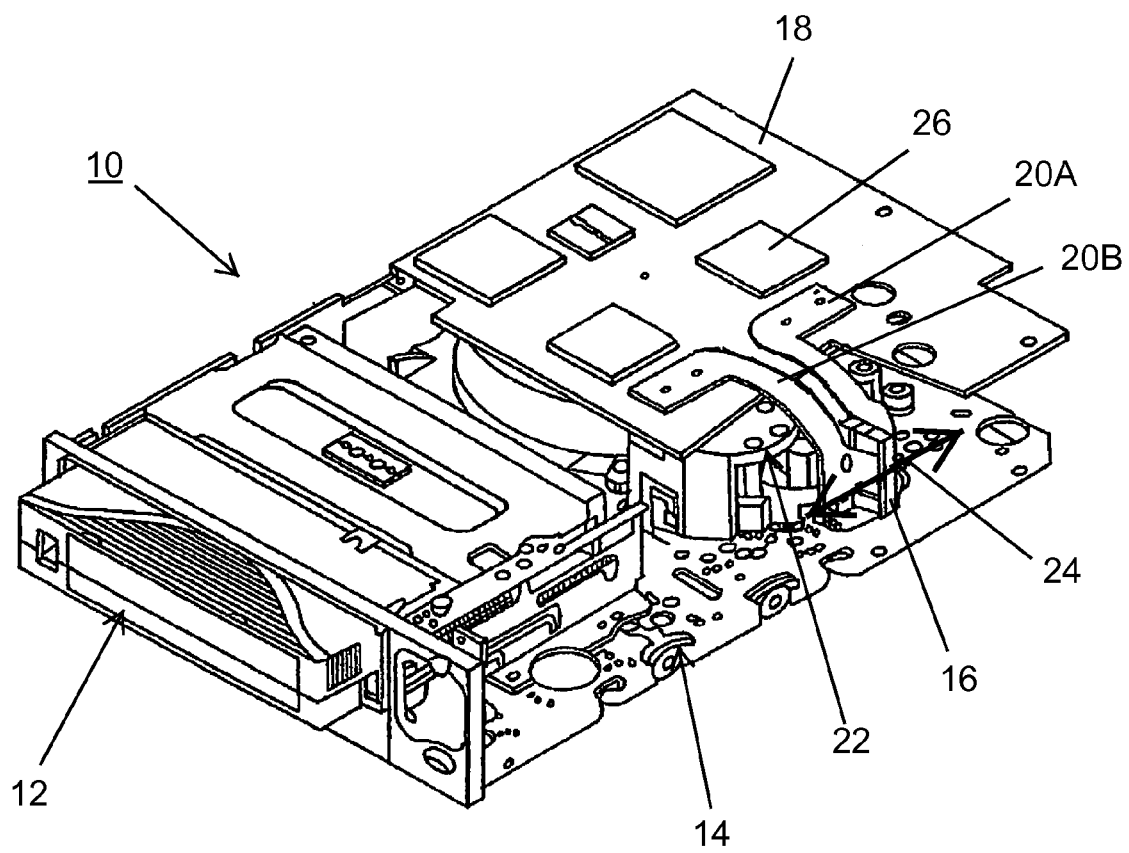
FIG. 1 is a perspective view of a tape cartridge and a portion of a tape drive including one embodiment of an actuator assembly having features of the present invention.

FIG. 1 depicts a perspective view of one embodiment of a media drive 10 (also sometimes referred to herein as a "drive") constructed in accordance with embodiments of the present invention, and a media cartridge 12 (sometimes referred to herein as a "cartridge") inserted within the drive 10. A housing for the drive 10, such as the top cover, is omitted from FIG. 1 for clarity. As one non-exclusive example, the media drive 10 can be a tape drive.

The cartridge 12, such as an LTO tape cartridge as one non-exclusive example, is insertable at one end of the tape drive 10. The cartridge 12 includes a storage tape (not shown) that stores data. The drive 10 also includes a drive base plate 14, a read/write head 16 (also sometimes referred to herein as a "head"), a printed circuit board 18, one or more flexible printed circuits 20A, 20B, and an actuator assembly 22. The storage tape of the cartridge 12 bidirectionally moves across the head 16 in a back-and-forth direction (illustrated by bidirectional arrow 24) that is substantially perpendicular to a longitudinal axis of the head 16. The head 16 is positioned relative to the storage tape by the actuator assembly 22. In one embodiment, the printed circuit board 18 can include a controller 26 that controls movement of the actuator assembly 22, and thus, positioning of the head 16, as set forth in greater detail below. Alternatively, the controller 26 can be positioned remotely from the printed circuit board 18, but can still maintain electrical communication with the printed circuit board 18. The flexible printed circuits 20A, 20B, electrically couple the actuator assembly 22 and/or the head 16 to the printed circuit board 18.

The controller 26 can control movement of the head 16 based on a positioning signal received from the head 16. This positioning signal is generated by the head based on servo information located on the storage tape. The head 16 transmits the positioning signal to the controller 26 to maintain the correct lateral position of the storage tape with respect to the head 16. This type of closed-loop system provides continuous feedback to the controller to determine and/or correct the position of the head 16 relative to the storage tape. In various embodiments, the controller 26 individually and/or collectively controls movement of two portions of the actuator assembly 22 in a closed-loop manner for both coarse and fine movement of the head 16 relative to the storage tape.

Figure 2B:
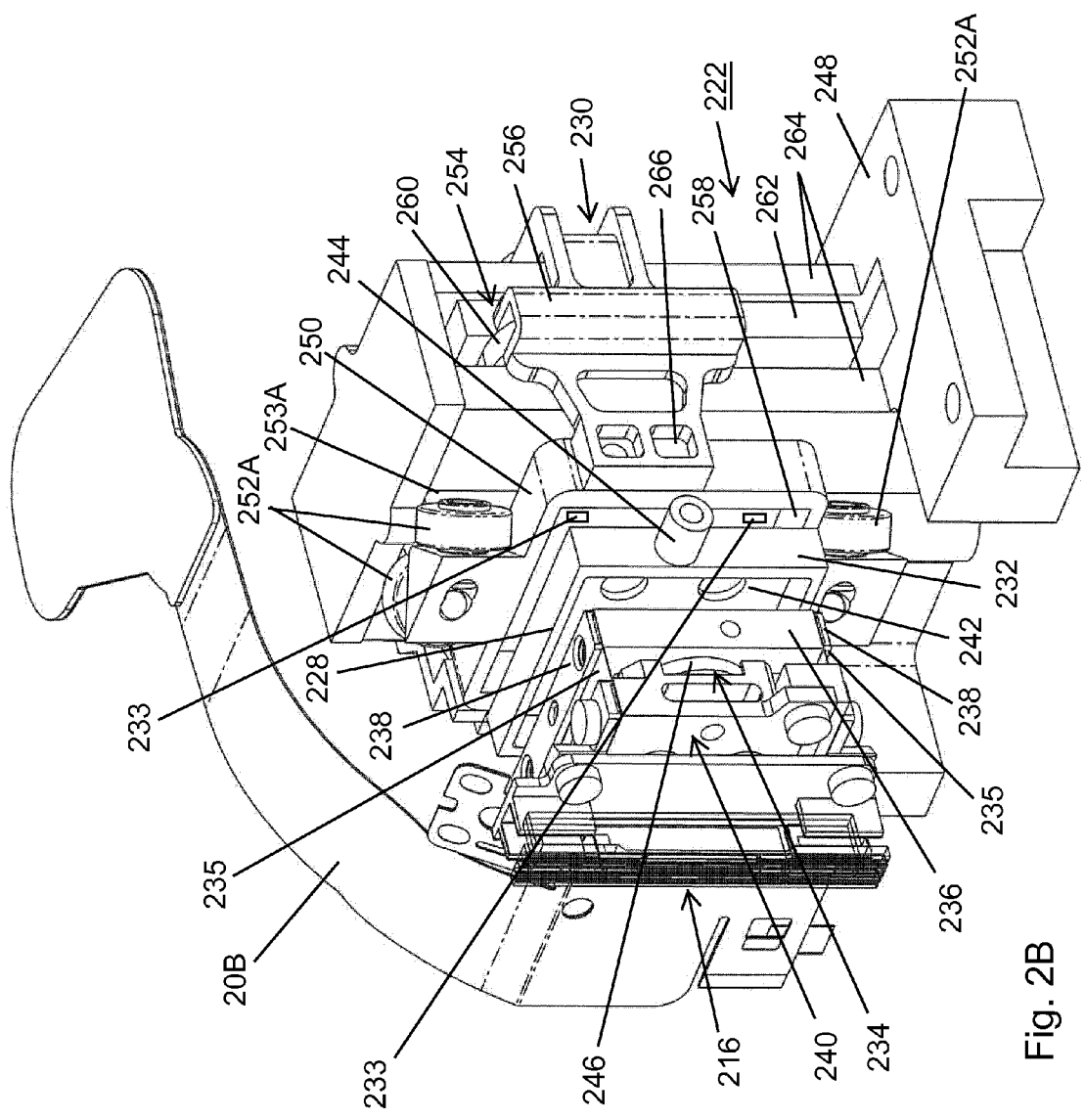
FIG. 2B is a partially exploded perspective view of a portion of the tape drive including the actuator assembly illustrated in FIG. 2A.

FIG. 2A is a perspective view of a head 216 and one embodiment of the actuator assembly 222, and FIG. 2B is a partially exploded perspective view of the embodiment of the actuator assembly 222 illustrated in FIG. 2A. One of the flexible printed circuits 20A (illustrated in FIG. 1) has been omitted from FIGS. 2A and 2B for clarity. The actuator assembly 222 positions the head 216 relative to the storage tape. The design of the actuator assembly 222 can vary to suit the design requirements of the drive 10. In the embodiment illustrated in FIGS. 2A and 2B, the actuator assembly 222 includes a first actuator 228 and a second actuator 230. In one embodiment, the first actuator 228 is secured to the second actuator 230 to reduce cross coupling between the actuators 228, 230, as set forth in greater detail below. In various embodiments, the second actuator 230 can move the first actuator 228 and the head 216 over approximately an entire width of the storage tape, i.e. approximately 9,000 microns, while the first actuator moves the head 216 over a much smaller distance, e.g., between approximately zero and 10 microns.

In certain embodiments, the first actuator 228 can include one or more of an isolation boot 232 (illustrated in FIG. 2B), one or more attachers 233 (illustrated in FIG. 2B), a first positioner 234, one or more flexures 235, a flexure bracket 236, one or more flexure clamps 238, and a first carriage 240. In one embodiment, the isolation boot 232 can be coupled to the second actuator 230 with the attacher(s) 233. As explained in greater detail below, the attachers 233 are positioned to decrease vibration of the first actuator 228 that may be caused by resonance characteristics or other vibration of the second actuator 230. Each attacher 233 can include an adhesive material or another suitable fastening-type material that can secure the isolation boot 232 to the second actuator 230.

The configuration and materials used to form the isolation boot 232 can vary to suit the design requirements of the first actuator 228 and the actuator assembly 222. In one embodiment, the isolation boot 232 can be formed from a relatively rigid damping material, such as rubber, elastic or various other suitable plastic compounds, as non-exclusive examples. With this design, the isolation boot 232 can at least partially decouple vibration of the second actuator 230 from the first actuator 228. In the embodiment illustrated in FIG. 2B, the isolation boot 232 can include a boot recess 242 that retains the flexure bracket 236. In addition, the isolation boot 232 can include one or more boot arms 244 (only one boot arm 244 is visible in FIGS. 2A and 2B) that extend into a portion of the second actuator 230 to allow substantially synchronized movement of the first actuator 228 by the second actuator 230. As provided herein, because the first actuator 228 is coupled to the second actuator 230, movement of the second actuator 230 in a direction that is substantially perpendicular to the tape path 16 (illustrated in FIG. 1) also moves the first actuator 228 in a substantially similar direction.

The first positioner 234 moves to translate movement of the head 216 in a direction that is substantially perpendicular to the storage tape (not shown). Further, the first positioner 234 moves the head 216 relative to the second actuator 230. In one embodiment, the first positioner 234 can include a substantially flat first voice coil 246, a first magnet 268 (illustrated in FIG. 3), and a first magnetic core 270 (illustrated in FIG. 3) that selectively moves the head 216a relatively short distance, i.e. fine positioning of the head 216 relative to the storage tape. The first positioner 234 moves the head 216 in a substantially linear manner based on analysis of servo signals, read from servo read elements disposed over corresponding servo tracks of a moving storage tape, to keep the head 216 in substantial alignment with a selected track on the storage tape.

The flexures 235 flex as a result of the movement of the first positioner 234. Flexing of the flexures 235 results in movement of the first carriage 240, and thus the head 216, in a direction that is substantially perpendicular to the tape path 24. In the embodiment illustrated in FIGS. 2A and 2B, the flexure bracket 236 is retained by and secured to the boot recess 242 of the isolation boot 232. Thus, the isolation boot 232 fits within a portion of the second actuator 230, and the flexure bracket 236 somewhat similarly fits within the isolation boot 232. With this design, the space required for the actuator assembly 222 within the drive 10 is reduced. The flexure clamps 238 secure the flexures 235 to the flexure bracket 236.

In the embodiment illustrated in FIGS. 2A and 2B, the first carriage 240 retains the first voice coil 246 of the first positioner 234. In addition, in one embodiment, the first carriage 240 also supports and/or retains the head 216. The head 216 can be retained by the first carriage 240 by a fastener such as an adhesive, an interference fit, mechanical fasteners such as screws, etc. In one embodiment, the first carriage 240 can be formed as a unitary structure. Alternatively, the first carriage 240 can include two or more structures that are secured to one another.

Figure 7:
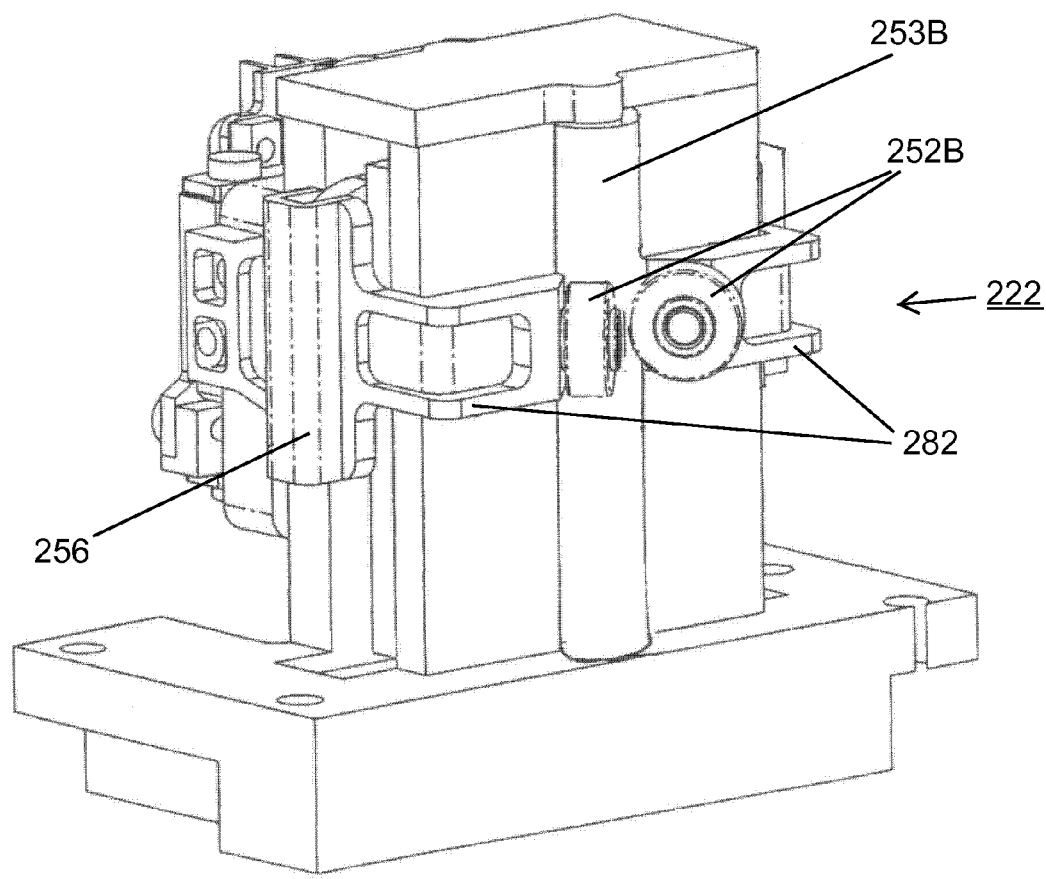
FIG. 7 is a rear perspective view of a portion of the tape drive including the actuator assembly illustrated in FIGS. 2A and 2B.

In one embodiment, the second actuator 230 can include one or more of an actuator base plate 248, a front bearing housing 250, a plurality of front bearings 252A and a plurality of rear bearings 252B (illustrated in FIG. 7), one or more positioner guides 253A, 253B (positioner guide 253B is illustrated in FIG. 7), a second positioner 254 and a second carriage 256. In this embodiment, the actuator base plate 248 supports the remainder of the actuator assembly 222 to position the head 216 at or near the tape path 24. The actuator base plate 248 can be secured to the drive base plate 14 (illustrated in FIG. 1) or to another suitable structure within the drive 10.

In this embodiment, the front bearing housing 250 includes a front bearing housing cavity 258 (illustrated in FIG. 2B) that retains and/or houses the isolation boot 232 of the first actuator 228 either directly or via the one or more of the attachers 233. The front bearing housing 250 also houses at least some of the bearings 252A. The bearings 252A can rollingly move along the positioner guide(s) 253A to provide relatively smooth and controlled movement of the second positioner 254 in a direction that is substantially perpendicular to the tape path 24. In this embodiment, the positioner guides 253A, 253B, are substantially in alignment with the head 216. Stated another way, in the embodiment illustrated in FIGS. 2A and 2B, as viewed from above the actuator assembly 222, the positioner guides 253A, 253B, and the head 216 are in a substantially collinear configuration 259, as illustrated in FIG. 2C. Alternatively, the positioner guides 253A, 253B, need not be collinear with the head 216.

The second positioner 254 includes a substantially flat second voice coil 260, a second magnet 262 and a somewhat U-shaped second magnetic core 264. The controller 26 (illustrated in FIG. 1) selectively directs current to the second voice coil 260, causing the second voice coil 260 to move relative to the second magnet 262 and the magnetic core 264. The second positioner 254 selectively results in movement of the first actuator 228a relatively large distance, i.e. up to or exceeding 9,000 microns. Movement of the first actuator 228 in turn moves the head 216. Thus, the second positioner 254 ultimately results in relatively coarse positioning of the head 216 in a substantially linear manner in a direction that is substantially perpendicular to the tape path 24. In one non-exclusive embodiment, the second positioner 254 causes movement of the head 216 at least approximately 1,000 times greater than that caused by independent movement of the head 216 by the first positioner 234.

In the embodiment illustrated in FIGS. 2A and 2B, the second carriage 256 retains the second voice coil 260. Therefore, when the second voice coil 260 is moved upon receiving current via the controller 26, the second carriage 256 likewise is moved in a direction that is substantially perpendicular to the tape path 24. In one embodiment, the second carriage 256 is also secured to the front bearing housing 250. Thus, upon movement of the second carriage 256 by the second positioner 254, the front bearing housing 250 is also moved to a similar extent, resulting in movement of the isolation boot 232, and thus, the first actuator 228 and the head 216 relative to the storage tape.

In one embodiment, the second carriage 256 includes one or more boot arm receivers 266 (one boot arm receiver 266 is illustrated in FIG. 2B). Each boot arm receiver 266 can receive and/or retain one boot arm 244 of the isolation boot 232 to maintain positioning of the isolation boot 232 and the flexure bracket 236 relative to the second actuator 230.

In accordance with certain embodiments provided herein, the first actuator 228 has a first fundamental resonance frequency and the second actuator 230 has a second resonance frequency that is different than the first fundamental resonance frequency. The first fundamental resonance frequency and/or the second resonance frequency can be selected and/or tuned to decrease or eliminate any correlation between the resonances of each actuator 228, 230, relative to one another. In other words, the configuration of the actuators 228, 230, can be designed to generate a desired corresponding resonance frequency for each actuator 228, 230. As one non-exclusive example, the actuators 228, 230, can be configured and/or tuned so that the first fundamental resonance frequency is substantially different than the second resonance frequency. In one embodiment, the first fundamental resonance frequency is designed based upon the second resonance frequency. In one embodiment, the second resonance frequency is at least 2 times or higher the first fundamental resonance frequency.

For example, the second resonance frequency can be at 2500 Hz. In this embodiment, the first fundamental resonance frequency resonance is tuned, i.e., the first actuator 228 is configured, so that the first fundamental resonance does not correlate with the resonance of the second actuator 230. In other words, it is advantageous to design the structures of the first actuator 228 so that its fundamental resonance do not align and/or correlate with the resonance of the second actuator 230. Thus the first actuator 228 can have a first fundamental resonance frequency such as 800 Hz, so that the first fundamental resonance is substantially different than the second resonance at 2500 Hz. With this design, the differences in resonance frequencies tend to decouple the vibration interaction between the actuators 228, 230. Further, it is recognized that the foregoing example is provided for ease of understanding only, and is not intended to limit the scope of the present invention in any manner.

Figure 3:
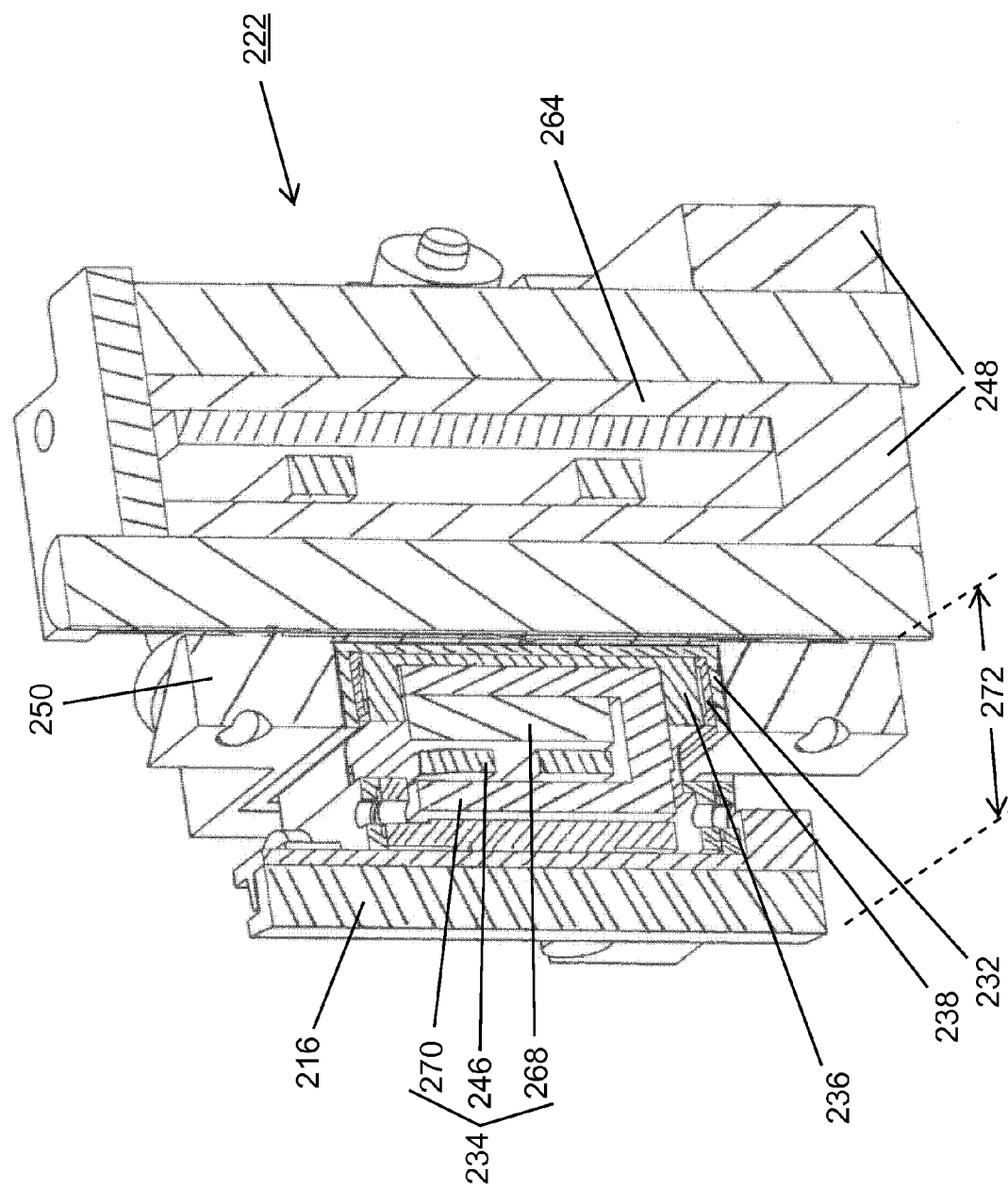
FIG. 3 is a cross-sectional view of one embodiment of the actuator assembly and a read/write head.

FIG. 3 is a cross-sectional view of the head 216 and actuator assembly 222 illustrated in FIGS. 2A and 2B. FIG. 3 illustrates that the isolation boot 232 at least partially, if not fully, fits within the front bearing housing 250. Further, FIG. 3 illustrates that the flexure bracket 238 at least partially, if not fully, fits within the isolation boot 232. Additionally, in this embodiment, the first positioner 234 includes the voice coil 246, a first magnet 268 and a first magnetic core 270. The first positioner 234 at least partially fits within the flexure bracket 236. With this design, the first actuator 228 has a decreased width 272, and the overall actuator assembly 222 is more compact, which conserves space within the drive 10.

In addition, as provided previously, the U-shaped second magnetic core 264 can be formed as a homogeneous structure and/or unitarily formed with the actuator base 248, which results in fewer separate parts that need to be assembled during manufacture of the actuator assembly 222 and the drive 10. Moreover, this construction reduces the likelihood of vibration caused by loosening of component parts during operation or transport of the drive 10.

Figure 4:
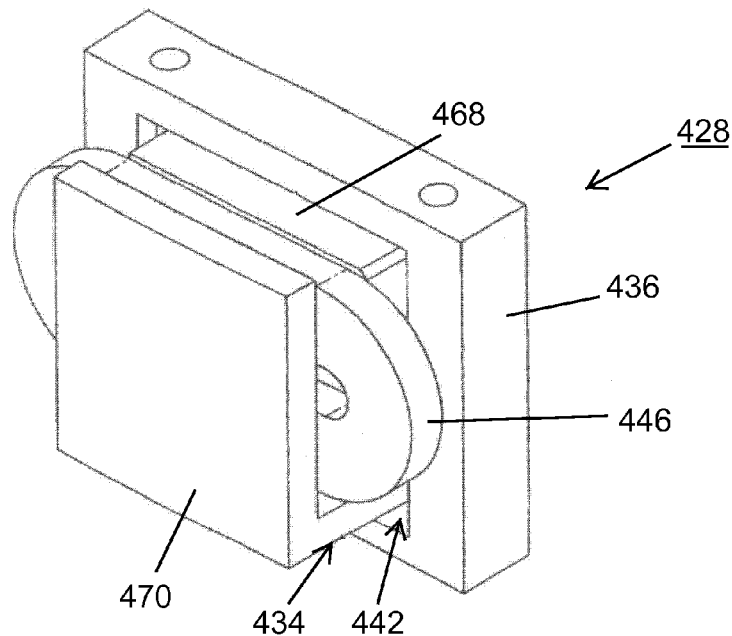
FIG. 4 is a perspective view of a portion of one embodiment of a first actuator of the actuator assembly.

FIG. 4 is a perspective view of a portion of one embodiment of the first actuator 428, including the first positioner 434 and the flexure bracket 436. In this embodiment, the first positioner 434 includes the first voice coil 446, the first magnet 468 and the first magnetic core 470. As illustrated in FIG. 4, a portion of the first positioner 434, including at least portions of the first magnet 468 and the first magnetic core 470 are positioned within the bracket recess 442 to conserve space within the drive 10.

Figure 5:
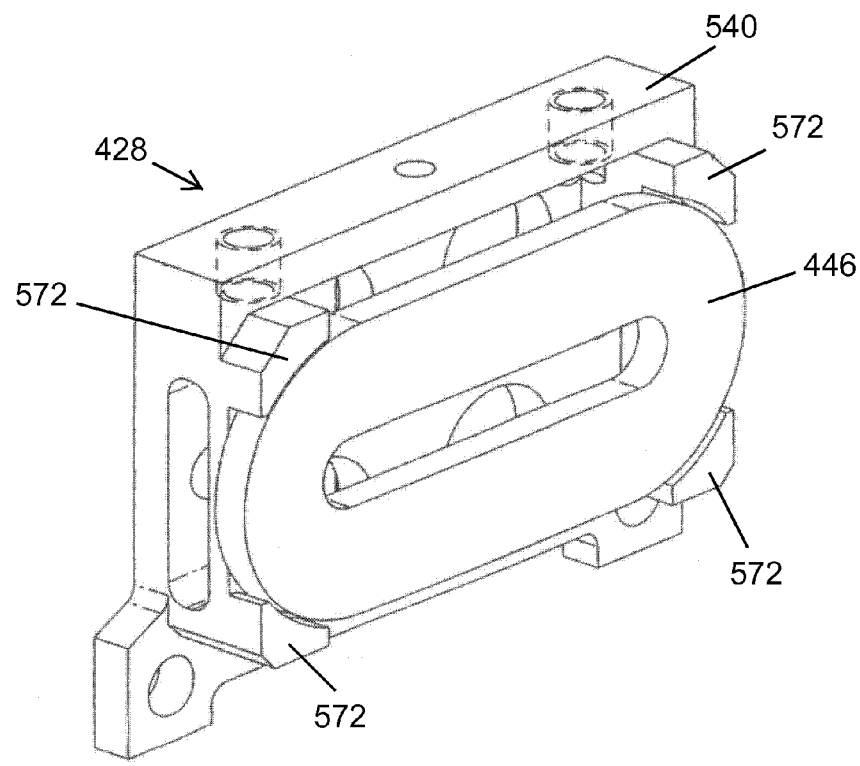
FIG. 5 is a perspective view of a portion of one embodiment of the first actuator of the actuator assembly.

FIG. 5 is a perspective view of a portion of the embodiment of the first actuator 428 illustrated in FIG. 4, including the first voice coil 446 and a portion of the first carriage 540. In the embodiment illustrated in FIG. 5, the first voice coil 446 is secured to the first carriage 540 by a plurality of coil holders 572 so that movement of the first voice coil 446 following receiving electrical current from the controller 26 (illustrated in FIG. 1) results in similar movement of the first carriage 540. In certain embodiments, because the first carriage 540 also retains the head 16 (illustrated in FIG. 1), the first carriage 540, the first voice coil 446, and the head 16 can essentially move as a unitary structure, thereby reducing the complexity of any vibration or other unwanted movement of the first actuator 428.

Figure 6:
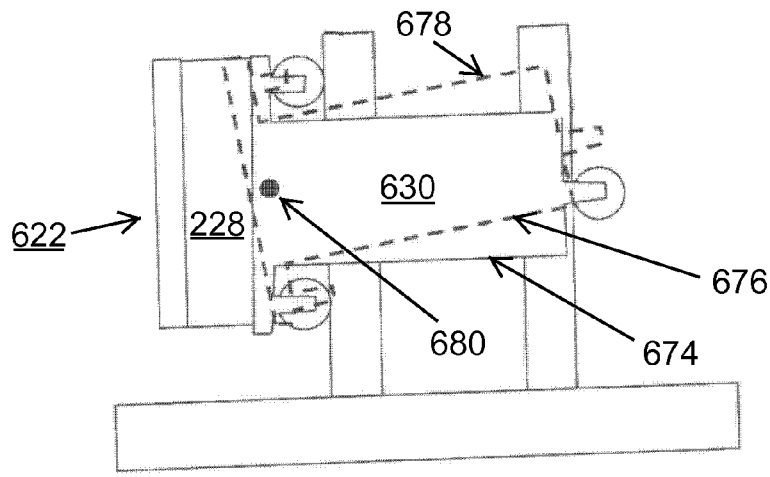
FIG. 6 is a simplified schematic view illustrating resonance of a portion of the actuator assembly.

FIG. 6 is a simplified schematic side view illustrating an example of resonance of the second actuator 630 of the actuator assembly 622. The second actuator 630 is represented at rest by solid line 674. The second actuator 630 is represented during operation by the dashed line 676. During operation, the second actuator 630 resonates as a result of movement of the second positioner 254 (illustrated in FIG. 2A), vibration of various other components of the drive 10, and other relevant factors. As a result of this resonance, various relatively high-motion regions 678 of the second actuator 630 move away from the at rest position 674 to a greater extent than other relatively low-motion regions, which generally occur at resonance node(s) 680 of the second actuator 630.

Referring also to FIG. 2A, in certain embodiments, the first actuator 228 is mounted and/or secured to the second actuator 230 based at least partially on the position of one or more resonance nodes 680 of the second actuator 230. For example, in one embodiment, the mounting location of the first actuator 228 to the second actuator 230 is approximately at, or in substantially close proximity to, the location of one of the resonance nodes 680 of the second actuator 230. With this design, normal resonance of the second actuator 230 does not have as great of an effect on unwanted movement (such as vibration, as one example) of the first actuator 228.

In one embodiment, during development of the actuator assembly 222 and/or the drive 10, finite element analysis (FEM) and/or laser mapping can be used to determine the positioning of the resonance node(s) 680 of the second actuator 230. Alternatively, other suitable methods for determining the positioning of the resonance node(s) 680 of the second actuator 230 can be utilized.

FIG. 7 is a rear perspective view of a portion of the tape drive 10 including the actuator assembly 222 illustrated in FIGS. 2A and 2B. In this embodiment, the second carriage 256 retains and/or supports bearings 252B that are rollingly guided by positioner guide 253B. In this embodiment, the second carriage includes one or more spring members 282 that bias the bearings 252B against the positioner guide 253B for substantially uninterrupted contact between the bearings 252B and the positioner guide 253B.

Figures 8A, 8B:
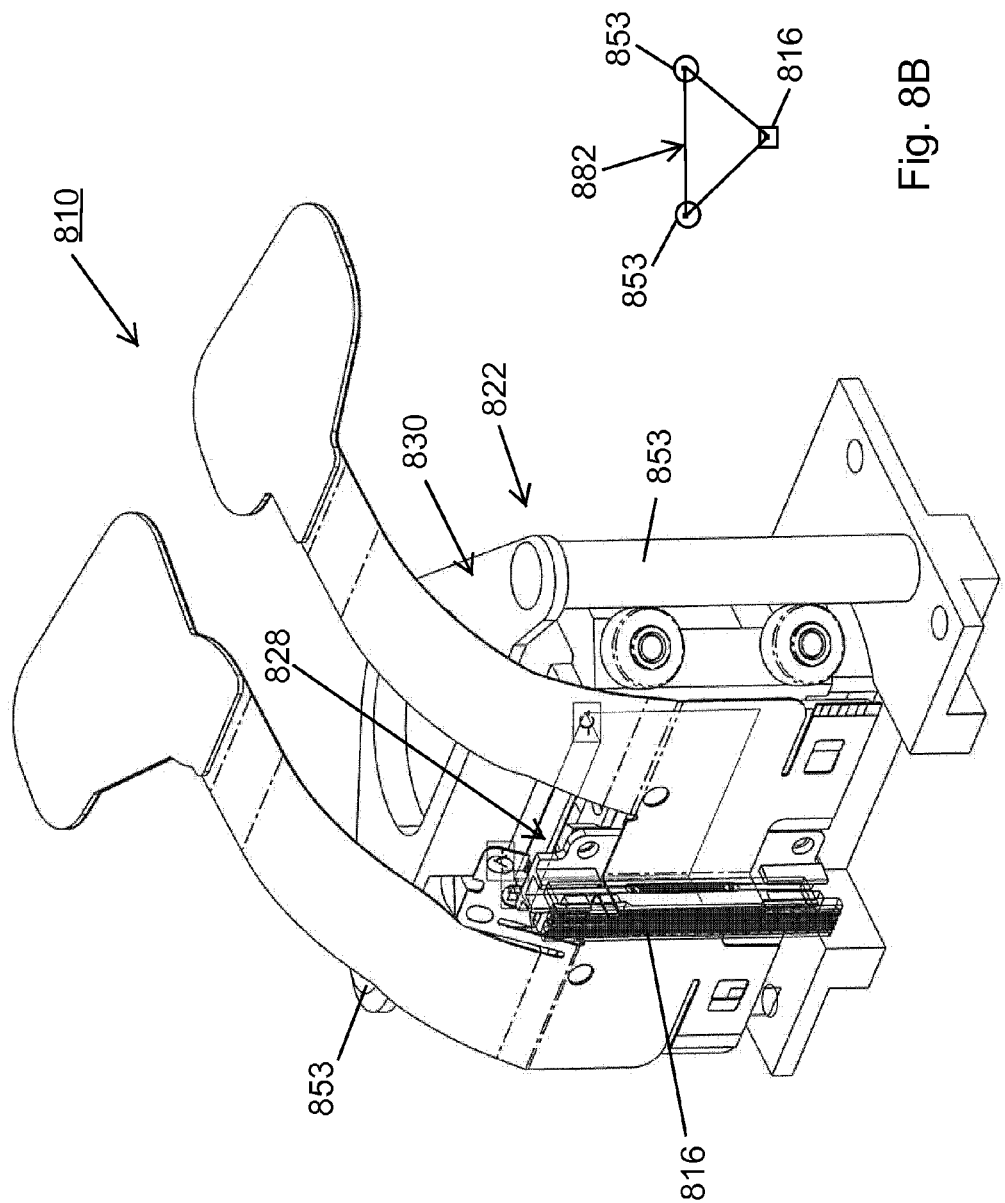
FIG. 8A is a perspective view of a portion of the tape drive including another embodiment of the actuator assembly.
FIG. 8B is a simplified schematic top view of a portion of the actuator assembly illustrated in FIG. 8A.

FIG. 8A is a perspective view of a portion of the tape drive 810 including another embodiment of the actuator assembly 822. In this embodiment, the actuator assembly 822 includes a first actuator 828 and a second actuator 830. In the embodiment illustrated in FIG. 8A, the first actuator 828 is substantially similar to the first actuator 228 previously described, such that many or all of the same components are present, even if relatively minor structural modifications are necessary to accommodate the second actuator 830. However, the first actuator 828 can be secured to the second actuator 830 in a substantially similar manner as that previously illustrated and/or described.

In this embodiment, the second actuator 830 includes two positioner guides 853 having a different orientation from that previously illustrated and described herein. In this embodiment, rather than the positioner guides 853 aligning in a substantially collinear manner with the head 816, the two positioner guides 853 and the head 816 form a triangular configuration 882 as viewed from above, as illustrated in FIG. 8B.

Figure 9:
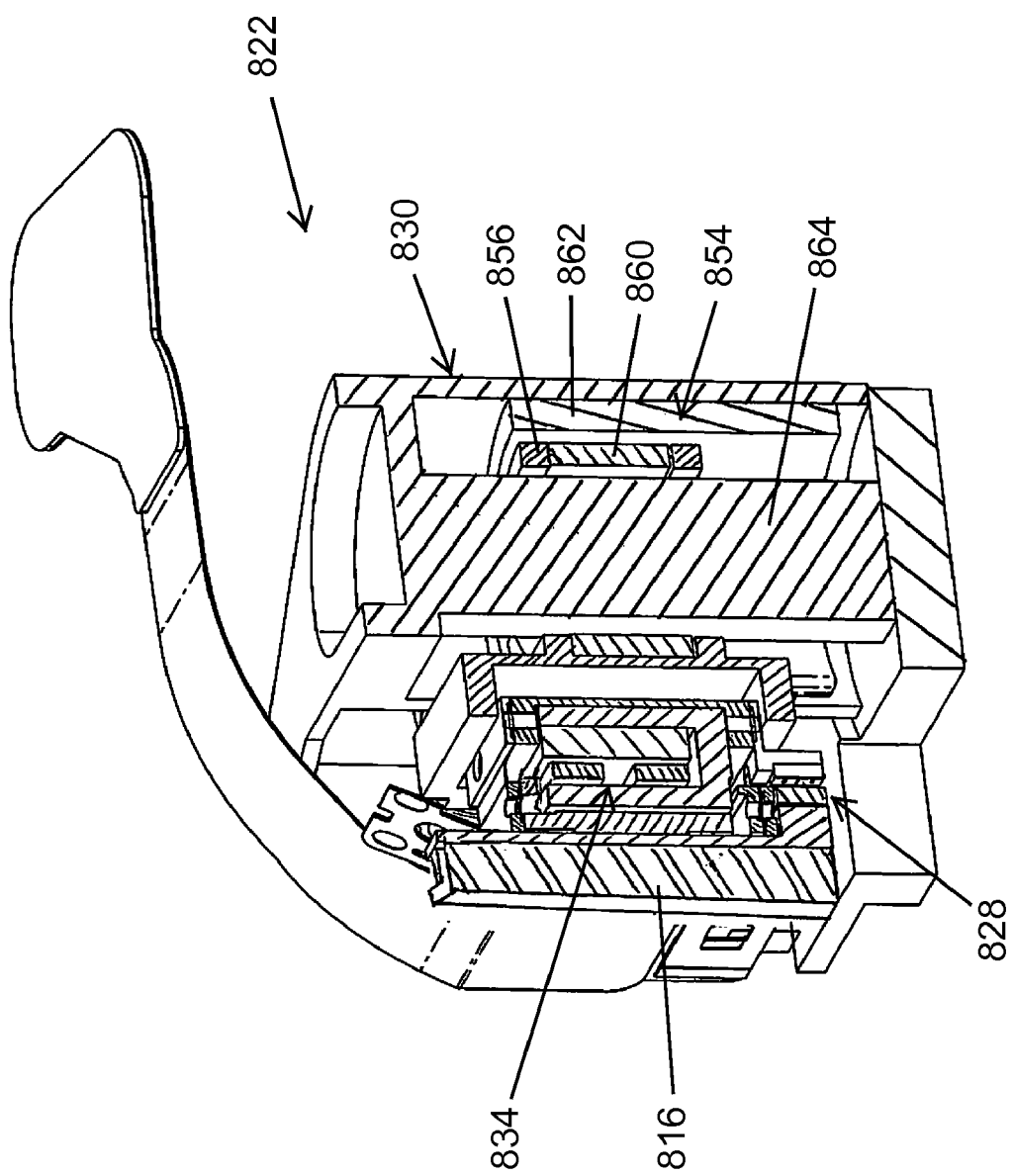
FIG. 9 is a cross-sectional view of a head and the actuator assembly illustrated in FIG. 8A.

FIG. 9 is a cross-sectional view of the head 816 and the actuator assembly 822 illustrated in FIG. 8A. In this embodiment, the second actuator 830 includes a second positioner 854 and a second carriage 856. However, in the embodiment illustrated in FIG. 9, the second positioner 854 includes a substantially circular second voice coil 860, a curved second magnet 862 and a second magnetic core 864. The second voice coil 860 substantially encircles the second magnetic core 864. The second magnet 862 at least partially, if not fully, encircles the second voice coil 860. The second carriage 856 is secured to and retains the second voice coil 860. As described previously, movement of the second voice coil 860 by the controller 26 (illustrated in FIG. 1) causes movement of the second carriage 856, and thus, the first actuator 828 and the head 816. Also as previously described herein, the first actuator 828 includes the first positioner 834 that moves independently from the second positioner 854 of the second actuator 830, although the controller can selectively and/or simultaneously control movement of both actuators 828, 830.

All of the following disclosed embodiments are used in conjunction with control logic operative to control the first actuator and the second actuator under closed loop servo control. A variety of algorithms can be used to move each of the first actuator and the second actuator in response to lateral movement of the storage tape detected by monitoring servo signals.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An actuator assembly for positioning a head of a tape drive relative to a storage tape that moves along a tape path, the actuator assembly comprising:
   a first actuator that moves the head in a direction that is substantially perpendicular to the tape path;
   a second actuator that moves the first actuator and the head in a direction that is substantially perpendicular to the tape path, the first actuator being mounted to the second actuator at a location that is based at least partially on a position of a resonance node of the second actuator; and
   a controller that receives a positioning signal from the head, the controller controlling positioning of the first actuator and the second actuator relative to the storage tape based at least partially on the positioning signal to move the head in a substantially linear manner relative to the storage tape.

2. The actuator assembly of claim 1 wherein the second actuator includes a second voice coil.

3. The actuator assembly of claim 2 wherein, the first actuator includes a first voice coil.

4. The actuator assembly of claim 3 wherein the first actuator includes a first carriage that retains the head and the first voice coil.

5. The actuator assembly of claim 3 wherein the first voice coil, includes a substantially flat coil.

6. The actuator assembly of claim 5 wherein the second voice coil includes a substantially circular coil.

7. The actuator assembly of claim 1 wherein the second actuator includes two positioner guides that guide movement of the first actuator in a direction that is substantially perpendicular to the tape path, and wherein the positioner guides and the head are positioned in a substantially collinear configuration.

8. The actuator assembly of claim 1 wherein the second actuator includes two positioner guides that guide movement of the first actuator in a direction that is substantially perpendicular to the tape path, and wherein the positioner guides and the head are positioned in a triangular configuration.

9. The actuator assembly of claim 1 wherein the first actuator includes an isolation boot positioned adjacent to the second actuator, the isolation boot decreasing vibration of the first actuator that is, caused by vibration of the second actuator.

10. The actuator assembly of claim 1 wherein the first actuator has a first fundamental resonance frequency and the second actuator has a second resonance frequency that is different than the first fundamental resonance frequency.

11. The actuator assembly of claim 10 wherein the first fundamental resonance frequency is tuned based on the second resonance frequency to decrease a correlation between the first fundamental resonance frequency and the second resonance frequency.

12. The actuator assembly of claim 1 wherein the tape drive includes a housing, and wherein the second actuator includes (i) a second voice coil, and (ii) an actuator base plate that is secured to the housing, the actuator base plate including a magnetic core that electromagnetically interacts with the second voice coil.

13. A tape drive including a head and the actuator assembly of claim 1 that supports the head.

14. An actuator assembly for positioning a head of a tape drive relative to a storage tape that moves along a tape path, the actuator assembly comprising:
a first actuator that moves the head in a direction that is substantially perpendicular to the tape path, the first actuator including a first voice coil, the first actuator having a first fundamental resonance frequency;
a second actuator that supports the first actuator and the head, the second actuator moving the first actuator and the head in a direction that is substantially perpendicular to the tape path, the second actuator having a second resonance frequency that is different than the first fundamental resonance frequency; and
a controller that receives a positioning signal from the head, the controller controlling positioning of the first actuator and the second actuator relative to the storage tape based at least partially on the positioning signal to move the head in a substantially linear manner relative to the storage tape.

15. The actuator assembly of claim 14 wherein the second actuator includes a second voice coil.

16. The actuator assembly of claim 14 wherein the first actuator includes a first carriage that retains the head and the first voice coil.

17. The actuator assembly of claim 14 wherein the first voice coil includes a substantially flat coil.

18. The actuator assembly of claim 17 wherein the first voice coil includes a substantially circular coil.

19. The actuator assembly of claim 14 wherein the second actuator includes two positioner guides that guide movement of the first actuator in a direction that is substantially perpendicular to the tape path, and wherein the positioner guides and the head are positioned in a substantially collinear configuration.

20. The actuator assembly of claim 14 wherein the second actuator includes two positioner guides that guide movement of the first actuator in a direction that is substantially perpendicular to the tape path, and wherein the positioner guides and the head are positioned in a triangular configuration.

21. The actuator assembly of claim 14 wherein the first actuator includes an isolation boot positioned adjacent to the second actuator, the isolation boot decreasing vibration of the first actuator that is caused by vibration of the second actuator.

22. The actuator assembly of claim 14 wherein, the tape drive includes a housing, and wherein the second actuator includes, (i) a second voice coil, and (ii) an actuator base plate that is secured to the housing, the actuator base plate including a magnetic core that electromagnetically interacts with the second voice coil.

23. The actuator assembly of claim 14 wherein the first fundamental resonance frequency is tuned based on the second resonance frequency to decrease a correlation between the first fundamental resonance frequency and the second resonance frequency.

24. A tape drive including a head and the actuator assembly of claim 14 that supports the head.

25. An actuator assembly for positioning a head of a tape drive relative to a storage tape that moves along a tape path, the actuator assembly comprising:
a first actuator that moves the head, in a direction that is substantially perpendicular to the tape path, the first actuator including (i) a first voice coil and (ii) an isolation boot that decreases vibration of the first actuator, the first actuator having a first fundamental resonance frequency;
a second actuator that moves the first actuator and the head in a direction that is substantially perpendicular to the tape path, the second actuator including a second voice coil, the second actuator having a second resonance frequency that is different than the first fundamental resonance frequency, the first actuator being mounted to the second actuator at a location that is based at least partially on a position of a resonance node of the second actuator; and
a controller that receives a positioning signal from the head, the controller controlling positioning of the first actuator and the second actuator relative to the storage tape based at least partially on the positioning signal to move the head in a substantially linear manner relative to the storage tape.

* * * * *

UNITED STATES PATENT AND TRADEMARK OFFICE
CERTIFICATE OF CORRECTION

| | | |
|---|---|---|
| PATENT NO. | : 8,059,355 B2 | Page 1 of 1 |
| APPLICATION NO. | : 12/480475 | |
| DATED | : November 15, 2011 | |
| INVENTOR(S) | : Nayak et al. | |

It is certified that error appears in the above-identified patent and that said Letters Patent is hereby corrected as shown below:

Col. 9, Line 28, replace "is," with --is--; and,

Col. 10, Line 41, replace "head," with --head--.

Signed and Sealed this
Twenty-seventh Day of December, 2011

David J. Kappos
*Director of the United States Patent and Trademark Office*